United States Patent [19]

Yatsuka et al.

[11] Patent Number: 4,842,942
[45] Date of Patent: Jun. 27, 1989

[54] MAGNETIC RECORDING MEDIUM

[75] Inventors: Takeshi Yatsuka, Ootsu; Nobukazu Kotera, Kyoto; Yutaka Mizumura, Ootsu, all of Japan

[73] Assignee: Toyo Boseki Kabushiki Kaisha, Osaka, Japan

[21] Appl. No.: 763,786

[22] Filed: Aug. 8, 1985

[30] Foreign Application Priority Data

Aug. 15, 1984 [JP] Japan .................................. 59-170737
Sep. 25, 1984 [JP] Japan .................................. 59-199994

[51] Int. Cl.$^4$ .............................................. G11B 5/70
[52] U.S. Cl. ................................. 428/425.9; 427/128; 427/130; 428/694; 428/900
[58] Field of Search ...................... 428/695, 694, 425.9, 428/900; 427/128, 130

[56] References Cited

U.S. PATENT DOCUMENTS

| | | | |
|---|---|---|---|
| 4,152,485 | 5/1979 | Mizumura | 427/128 |
| 4,520,079 | 5/1985 | Nakajima | 427/44 |
| 4,521,486 | 6/1985 | Ninomiya | 428/695 |
| 4,526,837 | 7/1985 | Ohtsuki | 427/44 |
| 4,529,661 | 7/1985 | Ninomiya | 428/328 |
| 4,600,521 | 7/1986 | Nakamura | 428/329 |
| 4,634,633 | 1/1987 | Ninomiya | 428/694 |
| 4,637,959 | 1/1987 | Ninomiya | 428/694 |
| 4,656,089 | 4/1987 | Ninomiya | 428/425.9 |

FOREIGN PATENT DOCUMENTS

| | | | |
|---|---|---|---|
| 20315 | 2/1985 | Japan | 428/694 |
| 39930 | 2/1986 | Japan | 428/694 |
| 39931 | 2/1986 | Japan | 428/694 |

*Primary Examiner*—Paul J. Thibodeau
*Attorney, Agent, or Firm*—Wenderoth, Lind & Ponack

[57] ABSTRACT

A magnetic recording medium prepared by applying a magnetic material onto a non-magnetic support, said coating material containing fine ferromagnetic particles dispersed in a binder and curing said magnetic coating material, characterized in that said binder comprises a thermoplastic resin or a radiation-curable resin wherein there is chemically bonded to the resin at least one phosphorous compound represented by the following formulae:

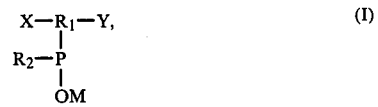

(I)

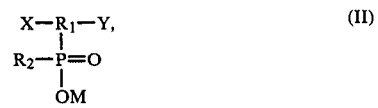

(II)

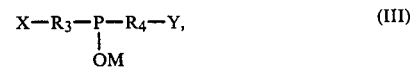

(III)

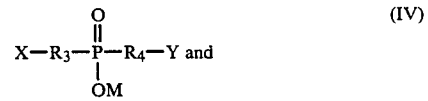

(IV)

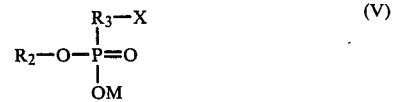

(V)

wherein, X, Y and $R_1$-$R_5$ is as disclosed herein. The present invention also relates to a method of producing said recording medium.

8 Claims, No Drawings

MAGNETIC RECORDING MEDIUM

The present invention relates to a magnetic recording medium superior in magnetic and mechanical characteristics.

A general-purpose magnetic tape is produced by coating a polyethylene terephthalate film with a magnetic coating material prepared by dispersing needle-like magnetic particles of not more than 1 μm in long axis in a binder together with suitable additives (e.g. dispersing agents, lubricants, antistatic agents). It is also well known that a coating of a magnetic coating material containing a radiation-curable binder and radiation treatment subsequent thereto enable the simplification of heat treatment and stabilization of various qualities.

For a magnetic recording medium are required high density and high regenerative output of magnetic records, and for these purposes, it is necessary to closely fill and highly orientate magnetic particles having a high coercive force. For close filling and high orientation, the magnetic particles should be dispersed as primary particles in a binder. Dispersion of magnetic particles is largely affected by a binder, and any dispersing apparatus, however high its dispersion efficiency may be, cannot disperse the magnetic particles in coating materials, if the dispersing ability of the binder is low. Magnetic particles having a high coercive force are now developed, but dispersion of the particles becomes difficult as the coercive force becomes high.

The conventionally used binder for magnetic coating materials includes vinyl chloride-vinyl acetate copolymers, vinyl chloride-vinyl acetate-vinyl alcohol copolymers, vinyl chloride-vinylidene chloride copolymers, thermoplastic polyurethane resins, thermosetting polyurethane resins, polyester resins, acrylonitrile-butadiene copolymers, nitrocellulose, cellulose acetate butyrate, epoxy resins, acrylic resins and the like. On the other hand, the radiation-curable binder includes vinyl chloride-vinyl acetate copolymers, epoxy resins, polyester resins, polyurethane resins, acrylic resins (having an acrylic double bond) and the like, but actually these binders are not satisfactory, particularly in terms of magnetic characteristics, for uses requiring high performances such as video tapes and electronic computer tapes. It is well known that a surfactant is used as a dispersing agent in order to improve the magnetic characteristics, but this method has a defect that the physical property of the magnetic coating layer lowers and changes with the lapse of the time because a surfactant of low molecular weight is present in the magnetic coating layer.

Magnetic tapes should be superior in not only magnetic characteristics but also mechanical characteristics such as abrasion resistance, running characteristics, flexibility and adhesion to supporting material, etc. As described in Japanese Patent Publication Nos. 17947/1969, 18222/1969, 24900/1970, 23500/1969, 24902/1970, 48126/1974, 31611/1973, 31610/1973, 14532/1967 and 6522/1976, magnetic tapes with polyester or polyurethane resins as a binder are superior in the mechanical characteristics, and therefore polyester and polyurethane resins are useful as binder for magnetic tapes.

It is disclosed in Japanese Patent Publication Nos. 3134/1982 and 41565/1983 and U.S. Pat. No. 4,152,485 that the dispersibility of magnetic particles is markedly improved by introducing a methyl sulfonate in polyester resins or polyurethane resins. This effect of the meta sulfonate results from the hydrophilicity thereof, and the same effect can also be expected from the metal salt of phosphorus compounds such as phosphinic acid, phosphonic acid, etc. The same effect may be expected from radiation-curable resins containing a metal salt of sulfonic acid or phosphorus compound. But, in producing polyester resins, polyurethane resins, polyester-acrylate resins, acrylate compounds, etc., the metal salt of phosphorus compounds such as phosphinic acid, phosphonic acid, etc. causes the inactivation of the catalyst, produces ether bonds to lower the physical property of the resulting polymer and because of a difference in polarity, does not react uniformly to separate from the reaction system. Also, in the production of polyurethane resins, polyurethane-acrylate resins, epoxy-acrylate resins, etc., the metal salt of phosphorus compounds such as phosphinic acid, phosphonic acid, etc., because of its remarkable inorganic nature, cannot be introduced into these resins by reaction in general-purpose solvents or without solvents.

In view of this situation, the present inventors have studied extensively with the object of improving the dispersibility of magnetic particles with the coating layer maintaining the mechanical property of polyester resins, polyurethane resins, epoxy resins, acrylic resins, etc. As a result, the present inventors found that, by using a particular phosphorus compound, polyurethane resins, polyurethane-acrylate resins, polyester-acrylate resins, epoxy-acrylate resins, etc. can stably be produced and remarkable improvement in the dispersibility of magnetic particles can be attained.

The present invention provides a magnetic recording medium prepared by applying onto a non-magnetic support a magnetic coating material containing fine ferromagnetic particles dispersed in a binder and curing said megnetic coating material, characterized in that said binder comprises, as its component, a thermoplastic resin or a radiationcurable resin wherein at least one of phosphorus compounds represented by the following formula (I) to (V),

(I)

(II)

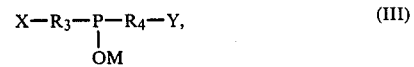

(III)

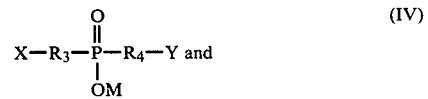

(IV)

(V)

is chemically bonded. In the general formula (I) to (V), each of X and Y is an ester-forming functional group, $R_1$ is trivalent hydrocarbon group having 3 to 10 carbon atoms, $R_2$ is a member selected from the class consisting of alkyl groups having 1 to 12 carbon atoms, cycloalkyl groups, aryl groups, alkoxy groups having 1 to 12 carbon atoms, cycloalkoxy groups and aryloxy groups wherein the aryl group may be substituted with a halogen atom, hydroxyl group, group of the formula —OM' (wherein M' represents an alkali metal) or amino group, each of $R_3$ and $R_4$ is a group selected from the class consisting of alkylene groups having 1 to 12 carbon atoms, cycloalkylene groups, arylene groups and groups of the formula

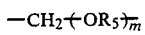

wherein $R_5$ is a group selected from the class consisting of alkylene groups having 1 to 12 carbon atoms, cycloalkylene groups and arylene groups, and m is any number of from 1 to 4, and M represents an alkali metal, hydrogen atom, alkyl group having 1 to 4 carbon atoms or amino group.

The thermoplastic resin used in the present invention includes for example polyurethane resins, polyester resins and the like.

The polyurethane resin used in the present invention is one having a molecular weight of 6,000 to 50,000 obtained by reacting (A) a polyesterdiol having a molecular weight of 500 to 20,000, (B) a chain extender having a molecular weight of less than 500 and (C) a polyisocyanate.

The polyesterdiol (A) used in producing the polyurethane resin of the present invention has a molecular weight ranging from 500 to 5,000, and its components except the particular phosphorus compounds are as follows.

As the carboxylic acid component of the polyesterdiol, there are given for example aromatic dicarboxylic acids (e.g. terephthalic acid, isophthalic acid, orthophthalic acid, 1,5-naphthalic acid), aromatic oxycarboxylic acids [e.g. p-oxybenzoic acid, p-(hydroxyethoxy)-benzoic acid], aliphatic dicarboxylic acids (e.g. succinic acid, adipic acid, azelaic acid, sebacic acid, dodecanedicarboxylic acid), alicyclic dicarboxylic acids (e.g. cyclohexanedicarboxylic acid, hydrogenated 2,6-naphthalenedicarboxylic acid) and the like.

As the glycol component of the polyesterdiol, there are given for example ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, cyclohexanedimethanol, ethylene oxide and propylene oxide adducts of bisphenol A, ethylene oxide and propylene oxide adducts of hydrogenated bisphenol A, polyethylene glycol, polypropylene glycol, polytetramethylene glycol and the like.

Trifunctional components such as trimellitic anhydride, trimethylolpropane, glycerin, etc. may be used so far as the performance is not damaged, preferably in amounts not more than 7% based on the total dicarboxylic acid or glycol components. Other polyesterdiols include lactone type polyesterdiols obtained by ring-opening polymerization of lactones such as ε-caprolactone, etc.

Particularly, when not less than 30 wt. % of the polyesterdiol of the present invention is a polyesterdiol comprising a dicarboxylic acid component composed of 50 to 100 mole % of the aromatic dicarboxylic acid and 50 to 0 mole % of the aliphatic and/or alicyclic dicarboxylic acid and a glycol component composed of 25 to 100 mole % of neopentyl glycol and 75 to 0 mole % of one or more glycols selected from aliphatic glycols having 2 to 10 carbon atoms, alicyclic glycols and aromatic ring-containing glycols, polyurethane resins having excellent adhesiveness to a polyethylene terephthalate film which is a general-purpose non-magnetic support as well as good abrasion resistance are obtained.

The polyurethane resin used in the present invention is characterized in that the polyesterdiol, one material for the resin, contains the phosphorus compound of the formula (I), (II), (III), (IV) or (V) as chemically bonded therein. Specific examples of the compound of the formula (I) are as follows:

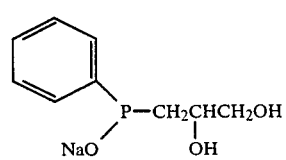

(1)

(2)

(3)

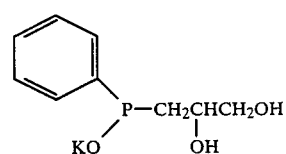

(4)

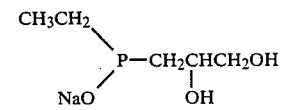

(5)

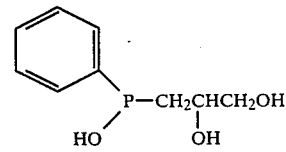

(6)

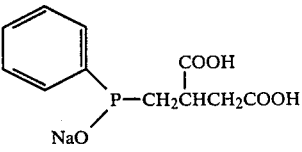

(7)

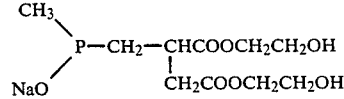

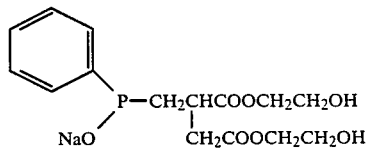

Specific examples of the compound of the formula (II) are as follows:

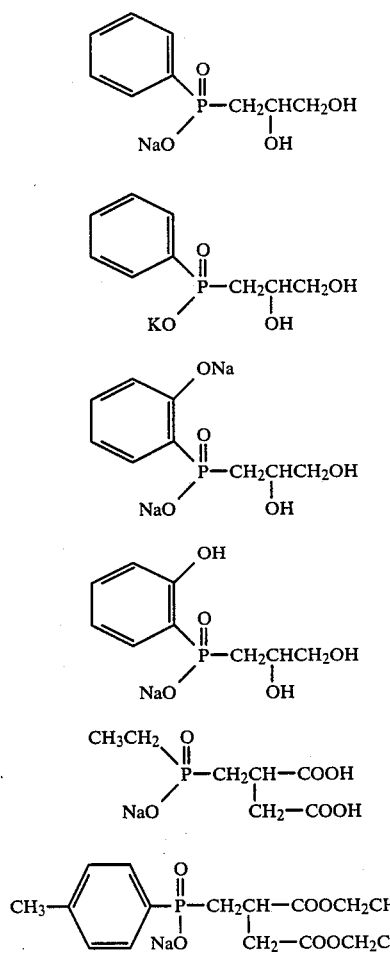
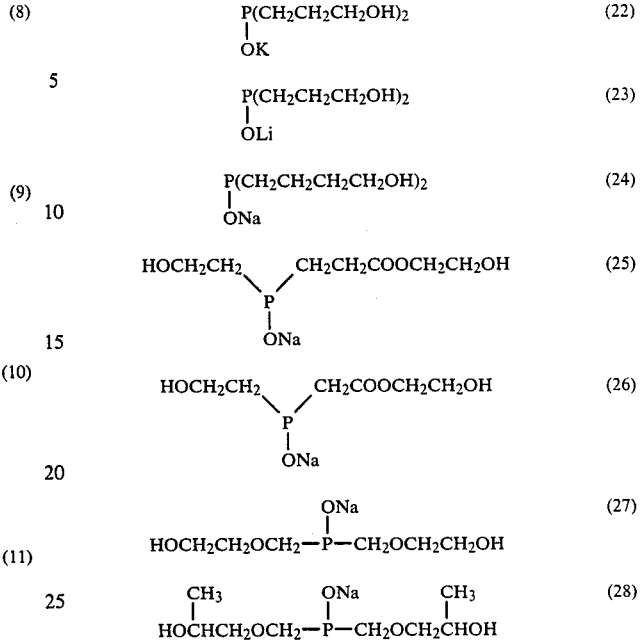
Specific examples of the compound of the formula (III) are as follows:
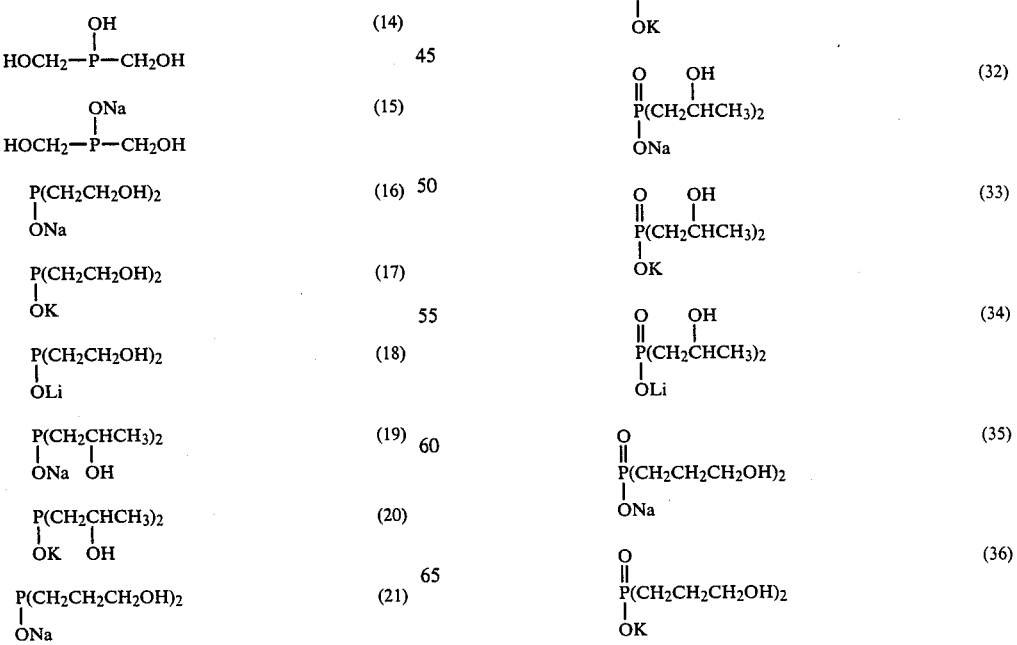
Specific examples of the compound of the formula (IV) are as follows:

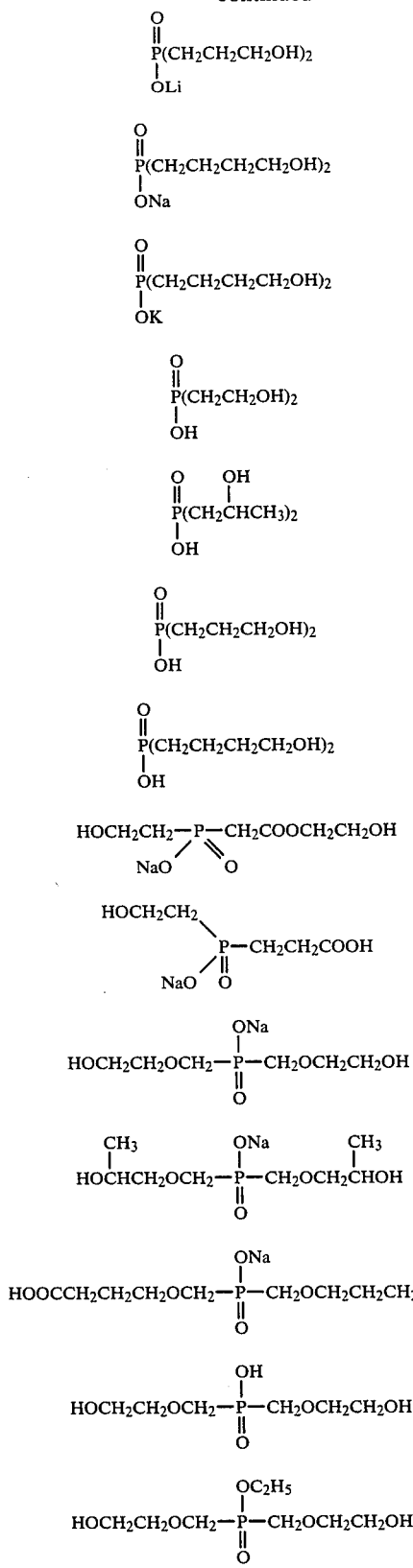
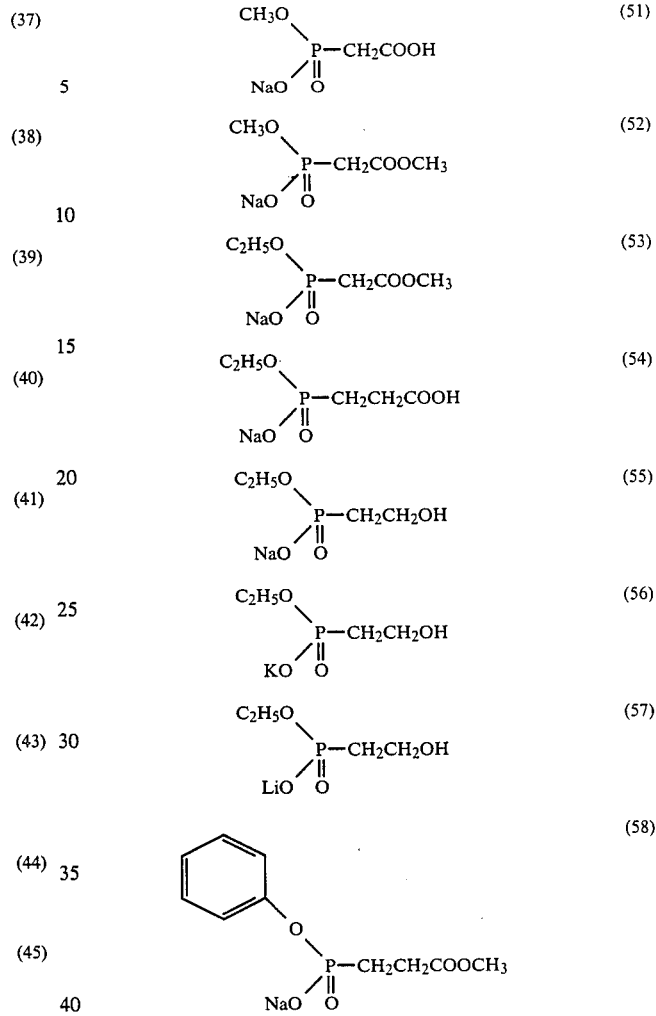

Specific examples of the compound of the formula (V) are as follows:

Polyesterdiol having (A) having a molecular weight of 500 to 5,000 used in producing the polyurethane resin of the present invention contains as at least one component polyesterdiol containing 0.1 to 20 mole % of the foregoing phosphorus compound based on the total dicarboxylic acid or glycol components. When the content of the phosphorus compound is less than 0.1 mole %, the dispersibility of magnetic particles is not improved, and when it is more than 20 mole %, the polyesterdiol becomes poor in compatibility with a phosphorus-free polyesterdiol which is added optionally, so that a uniform resin is not obtained. Also, when the polyesterdiol is used alone, there occur increase in hygroscopicity and solution viscosity as well as poor compatibility with other resins. A preferred phosphorus content of the polyurethane resin is in the range of 100 ppm to 20,000 ppm.

Polyesterdiol (A) should have a molecular weight of 500 to 5,000. When the molecular weight is less than 500, the content of the urethane group becomes so large that the resin becomes poor in flexibility and solubility in solvents. When the molecular weight is more than 5,000, the content of the urethane group reduces to deteriorate toughness and abrasion resistance characteristic of the polyurethane resin.

The chain extender (B) having a molecular weight of less than 500 used in the present invention has an effect of regulating the urethane group or urea group content of the polyurethane resin to give toughness characteristic of the resin. Its specific examples are as follows: Straight-chain glycols such as ethylene glycol, 1,3-propylene glycol, 1,4-tetramethylene glycol, 1,6-hexanediol, cyclohexanedimethanol, xylylene glycol, diethylene glycol, triethylene glycol, ethylene oxide adduct of bisphenol A, etc.; branched glycols such as propylene glycol, neopentyl glycol, 1,2-butanediol, 1,3-butanediol, 2,2,4-trimethyl-1,3-pentanediol, propylene oxide adduct of bisphenol A, etc.; aminoalcohols such as monoethanolamine, N-methylethanolamine, etc.; diamines such as ethylenediamine, hexamethylenediamine, isophoronediamine, piperazine, etc.; water and the like.

Other chain extenders than those described above include trifunctional ones such as trimethylolpropane, diethanolamine, triethanolamine, glycerin, etc. These chain extenders may be used so far as the performance is not damaged, that is, in amounts not more than 5 equivalent % based on the total amount of polyesterdiol (A) and chain extender (B).

Chain extenders having a molecular weight of more than 500 are not preferred because toughness characteristic of the polyurethane resin becomes poor.

As polyisocyanate (C) used in producing the polyurethane resin of the present invention, there are given for example diisocyanate compounds such as 2,4-tolylenediisocyanate, 2,6-tolylenediisocyanate, p-phenylenediisocyanate, diphenylmethanediisocyante, m-phenylenediisocyanate, hexamethylenediisocyanate, tetramethylenediisocyanate, 3,3'-dimethoxy-4,4'-biphenylenediisocyanate, 2,4-naphthalenediisocyanate, 3,3'-dimethyl-4,4'-biphenylenediisocyanate, 4,4'-diphenylenediisocyanate, 4,4'-diisocyanate-diphenyl ether, 1,5-naphthalenediisocyanate, p-xylylenediisocyanate, m-xylylenediisocyanate, 1,3-diisocyanatemethylcyclohexane, 1,4-diisocyanatemethylcyclohexane, 4,4'-diisocyanatedicyclohexane, 4,4'-diisocyanatecyclohexylmethane, isophoronediisocyanate, etc.; and triisocyanate compounds such as 2,4-tolylenediisocyanate trimer, hexamethylenediisocyanate trimer, etc. When the triisocyanate compound is used, its isocyanate content should be not more than 7 mole % based on the total isocyanate content.

In producing the polyurethane resin used in the present invention, the ratio of isocyanate group to hydroxyl group is in the range of 1/0.85-1.2, and it is a factor determining the molecular weight of the polyurethane resin. When the isocyanate content is too larger than the hydroxyl content, the resulting polyurethane resin is an isocyanate group-terminated resin, so that it becomes poor in the storage property. When the hydroxyl content is too larger than the isocyanate content, the molecular weight of the polyurethane resin decreases. Preferred range of the ratio is therefore 1/1 to 1/1.5.

The molecular weight of the polyurethane resin is in the range of 6,000 to 50,000. When it is less than 6,000, the mechanical strength of the resin becomes poor, and when it exceeds 50,000, the solution viscosity becomes too high for handling.

Polyaddition reaction for producing the polyurethane resin of the present invention includes the one-shot method in which the whole components are reacted at the same time, and prepolymer method in which a long-chain diol is first reacted with isocyanate in the condition wherein isocyanate is present in excess, and the resulting isocyanate-terminated prepolymer is polymerized using a chain extender. The thermoplastic polyurethane resin of the present invention can be produced by either of the both methods. The reaction may be carried out in either state of melt or solution.

Stannous octylate, dibutyltin dilaurate, triethylamine, etc. may be used as a reaction catalyst.

For preventing gelation in producing the polyurethane resin, p-toluenesulfonic acid, butadienesulfonic acid, inorganic acids, oxyacids, etc. may be used.

Ultraviolet absorbers, hydrolysis inhibitors, antioxidants, etc. may be added before, during or after production of the polyurethane resin.

As the polyester resin of the present invention, the foregoing polyesterdiol (A) having a molecular weight of 500 to 20,000 may be used.

The radiation-curable resin of the present invention is a phosphorus-containing radiation-curable resin having at least one acrylic double bond and at least one of the phosphorus compounds of the formulae (I) to (V) chemically bonded therein. Specifically, there are given resins bonded to an acrylic double bond-containing compound (D) through at least one of urethane bond, ester bond, ether bond and amide bond. For example, polyurethane-acrylate resins, polyester-acrylate resins, epoxy-acrylate resins, various kinds of acrylate compound and the like are give.

The acrylic double bond contained in the radiation-curable resin of the present invention refers to the residue of acrylic acid, acrylic ester, acrylic amide, methacrylic acid, methacrylic ester, methacrylic amide, etc. (this residue is called acryloyl or methacryloyl).

The acrylic double bond-containing compound (D) includes for example carboxyl group-containing acrylic compounds (D-1) such as (meth)acrylic acid; hydroxyl group-containing acrylic compounds (D-2) such as mono(meth)acrylates of glycols (e.g. ethylene glycol, diethylene glycol, hexamethylene glycol), mono- and di(meth)acrylates of triol compounds (e.g. trimethylolpropane, glycerin, trimethylolethane), mono-, di- and tri(meth)acrylates of tetra or more-valent polyols (e.g. pentaerythritol, dipentaerythritol), glycerin monoallyl ether, glycerin diallyl ether, etc.; glycidyl group-containing acrylic compounds (D-3) such as glycidyl (meth)acrylate; amino group-containing acrylic compounds (D-4) such as (meth)acrylic amide, monomethylol (meth)acrylic amide, etc.; and isocyanate group-containing acrylic compounds (D-5) such as cyanoethyl (meth)acrylate.

At least one of these acrylic double bonds needs to be present in the molecule of the radiation-curable resin. When the number of the double bonds is less than 1, than crosslinking density does not become sufficiently high, so that only a coating layer inferior in mechanical strength is obtained.

The polyurethane-acrylate resin is generally obtained by reaction of a hydroxyl group-containing resin, a hydroxyl group-containing acrylic compound (D-2) and a polyisocyanate-containing compound (C). The hydroxyl group-containing resin includes polyalkylene glycols (e.g. polyethylene glycol, polybutylene glycol, polypropylene glycol), alkylene oxide adducts of bisphenol A, various kinds of glycol, polyesterpolyols (E) having a hydroxyl group at the terminal of the molecular chain, etc. Of these resins, polyurethane-acrylate resins produced with polyesterpolyol (E) as one component are preferred.

As the carboxylic acid component of polyesterpolyol (E) used in the present invention, there are given for example aromatic dicarboxylic acids (e.g. terephthalic acid, isophthalic acid, orthophthalic acid, 1,5-naphthalic acid), aromatic oxycarboxylic acids [e.g. p-oxybenzoic acid, p-(hydroxyethoxy)benzoic acid], aliphatic dicarboxylic acids (e.g. succinic acid, adipic acid, azelaic acid, sebacic acid, dodecanedicarboxylic acid), unsaturated aliphatic and alicyclic dicarboxylic acids (e.g. fumaric acid, maleic acid, itaconic acid, tetrahydrophthalic acid), hexahydrophthalic acid, hexahydroterephthalic acid, tri- and tetracarboxylic acids (e.g. trimellitic acid, trimesic acid, pyromellitic acid) and the like.

As the glycol component of polyesterpolyol (E), there are given for example ethylene glycol, propylene glycol, 1,3-propanediol, 1,4-butanediol, 1,5-pentanediol, 1,6-hexanediol, neopentyl glyocl, diethylene glycol, dipropylene glycol, 2,2,4-trimethyl-1,3-pentanediol, 1,4-cyclohexanedimethanol, ethylene oxide and propylene oxide adducts of bisphenol A, ethylene oxide and propylene oxide adducts of hydrogenated bisphenol A, polyethylene glycol, polypropylene glycol, polytetramethylene glycol and the like. Also, tri- and tetraols such as trimethylolethane, trimethylolpropane, glycerin, pentaerythritol, etc. may be used together with the above glycols.

As polyisocyanate (C), there are given for example 2,4-tolylenediisocyanate, 2,6-tolylenediisocyanate, p-phenylenediisocyanate, diphenylmethanediisocyanate, m-phenylenediisocyanate, hexamethylenediisocyanate, tetramethylenediisocyanate, 3,3'-dimethoxy-4,4'-biphenylenediisocyanate, 2,4-naphthalenediisocyanate, 3,3'-dimethyl-4,4'-biphenylenediisocyanate, 4,4'-diphenylenediisocyanate, 4,4'-diisocyanate-diphenyl ether, 1,5-naphthalenediisocyanate, p-xylylenediisocyanate, m-xylylenediisocyanate, 1,3-diisocyanatemethylcyclohexane, 1,4-diisocyanatemethylcyclohexane, 4,4'-diisocyanatedicyclohexane, 4,4'-diisocyanatedicyclohexylmethane, isophoronediisocyanate and the like. If necessary, 2,4,4'-triisocyanatediphenyl, benzenetriisocyanate, etc. may be used in small amounts.

The polyester-acrylate resin is obtained by reacting a hydroxy group-containing polyester resin (E) with one of the foregoing acrylic compounds of the formulae (D-1) to (D-4), or producing said resin (E) with addition of one of said acrylic compounds.

The epoxy-acrylate resin is obtained by reacting a glycidyl group-containing epibis-type epoxy resin or novolak-type epoxy resin with one of the foregoing acrylic compounds of the formulae (D-1) to (D-5).

Various kinds of acrylate compound are obtained by reacting a glycol (e.g. ethylene glycol, neopentyl glycol, diethylene glycol, trimethylolpropane, pentaerythritol) with one of the acrylic compounds of the formulae (D-1) to (D-4).

The particular phosphorus compound characterizing the thermoplastic resins (e.g. polyurethane resins, polyester resins) and radiation-curable resins (e.g. polyurethane-acrylate resins, polyester-acrylate resins, epoxy-acrylate resins, acrylate compounds) used in the present invention is ones represented by the foregoing formulae (I) to (IV). The structural formulae of typical examples of these phosphorus compounds are as shown hereinbefore.

These particular phosphorus compounds may be added to the reaction system at any step of producing the radiation curable resins. For example, they may be added as one component in producing the starting material such as polyesterpolyol (E), polyalkylene glycol, epoxy resins, etc. Particularly in producing polyesterpolyol (E), they may be added at any step before completion of polymerization of polyesterpolyol (E). In terms of operation on production, it is preferred to add them at steps after ester interchange reaction or esterification. Also, these particular phosphorus compounds may be used as one component of starting materials for the radiation-curable resins such as polyurethaneacrylate resin, polyester-acrylate resin, epoxy-acrylate resin, acrylate compound, etc. For example, the polyurethane-acrylate resin can be produced by reacting directly the hydroxyl group-containing phosphorus compound with the isocyanate compound (C) and acrylate compound (D).

The radiation-curable resin of the present invention can be produced by reacting the acrylic double bond-containing compound (D) with the particular phosphorus compound and/or a resin containing said particular phosphorus compound chemically bonded therein in the presence or absence of a solvent. The molecular weight of the resulting resin is preferably 500 to 100,000.

It is preferred to use the phosphorus compound of the foregoing formula (I) to (V) so that the phosphorus atom content of the thermoplastic resin or radiation-curable resin is 100 to 20,000 ppm. When the content is below the above range, the dispersibility of magnetic particles becomes poor, while when it exceeds the above range, the hygroscopicity becomes remarkably high and the physical properties and adhesiveness to non-magnetic supporting layer become poor.

In the present invention, for the purpose of regulating the flexibility of magnetic recording medium and improving the thermal resistance, cold resistance and abrassion resistance thereof, it is preferred to use the thermoplastic resin or radiation-curable resin, which contains at least one of the phosphorus compounds of the formula (I) to (V) chemically bonded therein, together with other resin compatible with said resin, or a crosslinkable compound with said resin.

The other resin compaticble with the resin of the present invention includes for example polyvinylchloride resins, polyester resins, cellulosic resins, epoxy resins, phenoxy resins, polyvinylbutyral, acrylonitrile-butadiene copolymers and the like.

The compound crosslinkable with the thermoplastic resin includes for example polyisocyanate compounds, epoxy resins, melamine resins, urea resins and the like. Of these, polyisocyanate compounds are particularly preferred.

Further, the compound cross-linkable with the radiation-curable resin includes for example acrylic oligomers having a molecular weight of 200 to 10,000 such as epoxy acrylic oligomers, spiran ring-containing acrylic oligomers, ether acrylic oligomers, acrylic polyhydric alcohols and the like.

The ferromagnetic particle used in the present invention includes for example $\gamma$-$Fe_2O_3$, $\gamma$-$Fe_2O_3$/$Fe_3O_4$ mixed crystal, $CrO_2$, cobalt ferrite, cobalt containing iron oxide, ferromagnetic alloy powders such as Fe-Co, Fe-Co-Ni and the like.

To the magnetic recording medium of the present invention may be added if necessary plasticizers such as dibutyl phthalate, triphenyl phosphate, etc., and lubricants and antistatic agents such as dioctylsulfosodium succinate, tert-butylphenol polyethylene ether, sodium ethylnaphthalenesulfonate, dilauryl succinate, zinc stearate, soybean oil lecithin, silicone oil and the like.

A solvent is generally used for producing magnetic coating material having a ferromagnetic powder dispersed in a binder. As such solvent, there are given for example ketones (e.g. acetone, methyl ethyl ketone, methyl isobutyl ketone, cyclohexanone), alcohols (e.g. methanol), esters (e.g. methyl acetate, ethyl acetate, butyl acetate, ethyl butyrate), glycol ethers (e.g. ethylene glycol dimethyl ether, ethyleneglycol monoethyl ether, dioxane), aromatic hydrocarbons (e.g. benzene, toluene, xylene), aliphatic hydrocarbons (e.g. hexane, heptane) and mixtures thereof.

The magnetic recording medium of the present invention is produced by coating the above magnetic material onto a non-magnetic support. The material for the non-magnetic support includes for example polyesters (e.g. polyethylene terephthalate), polyolefins (e.g. polypropylene), cellulose derivatives (e.g. cellulose triacetate, cellulose diacetate), polycarbonate, polyvinylchloride, polyimide, metals (e.g. aluminum, copper), paper and the like.

The magnetic material is coated onto the nonmagnetic support and dried, and the resulting coating layer is subjected to calendering if necessary and then to heat-treatment or radiation-treatment. Calendering may be applied after heat-treatment or radiation-treatment. As the radiation applied, electron ray and electrolytic radiations such as neutron ray, $\gamma$-ray, etc. may be used. The irradiation amount is generally about 1 to about 10 Mrad, preferably about 2 to about 8 Mrad.

The thermoplastic resin, for example a polyurethane resin, used in the present invention becomes a uniform resin superior in dispersibility of magnetic particles by incorporating the particular phosphorus compound in the molecule of the polyesterdiol which is one component of said resin. Because of this, the magnetic recording medium, of which the binder contains the thermoplastic resin as at least one component, is good in dispersibility of magnetic particles, and superior in the characteristics resulting from the dispersibility, for example filling characteristics and orientation of magnetic particles and smoothness of the magnetic layer, and therefore the durability of the magnetic recording medium is good with little powder-dropping.

Also, in the present invention, by using as a binder a resin having at least one acrylic double bond and the chemically bonded particular phosphorus compound in the molecule, the dispersibility of magnetic particles in the radiation-cured coating layer can be improved while maintaining the mechanical characteristics of polyester resins, polyurethane resins, epoxy resins, acrylic resins, etc. As a result, characteristics resulting from the dispersibility, for example filling characteristics and orientation of magnetic particles and smoothness of magnetic layer are superior, and durability is good with little powder-dropping.

EXAMPLE

The present invention will be illustrated specifically with reference to the following Examples. Part simply referred to herein means part by weight. The physical properties were measured as follows:

Gloss of magnetic layer: Measured at an angle of 60 degrees.

Abrasion after 100 runnings: Magnetic tape is set on a video deck, and abrasion status of the magnetic layer after 100 runnings is observed.

Adhesiveness to polyethylene terephthalate (PET) film: Cellophane adhesive tape is stuck onto the surface of the magnetic layer, and then peeled off, and a status after the magnetic layer is peeled off the PET film is observed.

O No peeling
Δ Almost half peeling
X Complete peeling

Smoothness: The surface of the curable layer is visually judged.

Solvent resistance: Coating film is rubbed with gauze impregnated with methyl ethyl ketone, and the number of rubbings required until the substrate is exposed, is measured.

Preparation (1) of polyesterdiol

To an autoclave equipped with a thermometer and a stirrer were added 194 parts of dimethyl terephthalate, 194 parts of dimethyl isophthalate, 149 parts of ethylene glycol, 166 parts of neopentyl glycol and 0.05 part of tetrabutoxy titanate, and the temperature of the mixture was kept at 150° to 230° C. for 120 minutes to carry out ester interchange. Thereafter, 11 parts of sodium 2,3-dihydroxyproplyphenyl phosphonite [phosphorus compound (1)] was added, and reaction was carried out at 220° C. for further 1 hour.

The reaction system was heated to 240° C. in 30 minutes, the pressure of the system was gradually released to 1 to 3 mmHg in 45 minutes, and reaction was continued for 30 minutes under this condition. The resulting polyesterdiol (1) had a molecular weight of 2,5000, and according to NMR and phosphorus analysis the components were: Molar ratio of terephthalic acid/isophthalic acid/ethylene glycol/neopentyl glycol/sodium 2,3-dihydroxypropylphenyl phosphonite=50/50/55/43/2.

In the same manner as above, polyesterdiols (2) to (15) described in Table 1 were obtained. The polyesterdiols (14) and (15) contain 0.05 mole % and 25 mole %, respectively, of phosphorus compound based on the total glycol components, and the polyesterdiol (13) contains no phosphorus compound.

TABLE 1

| | Component (mole %) | Polyesterdiol | | | | | | | | | | | | | | |
|---|---|---|---|---|---|---|---|---|---|---|---|---|---|---|---|---|
| | | (1) | (2) | (3) | (4) | (5) | (6) | (7) | (8) | (9) | (10) | (11) | (12) | (13) | (14) | (15) |
| Acid Component | Terephthalic acid | 50 | | 50 | 50 | 50 | 30 | 25 | 50 | | 50 | 50 | 50 | 50 | 50 | 50 |
| | Isophthalic acid | 50 | 60 | | 47 | 49 | | 45 | | | 50 | 50 | 45 | 50 | 50 | 50 |
| | Orthophthalic acid | | | 40 | | | | | | | | | | | | |
| | Adipic acid | | | | | 50 | | 70 | 75 | 100 | | | | | | |
| | Trimellitic anhydride | | | | | | | | | | | | 5 | | | |
| Glycol component | Ethylene glycol | 55 | 10 | 45 | 50 | 50 | 50 | 50 | 55 | 95 | 55 | 55 | 55 | 55 | 55 | 55 |
| | Neopentyl glycol | 43 | 30 | 52 | 50 | 50 | 47 | 45 | 45 | | 44.9 | 25 | 40 | 45 | 44.95 | 20 |
| | Cyclohexanedimethanol | | | 55 | | | | | | | | | | | | |
| Phosphorus compound component | (1) | 2 | | | | | | | | | | | | | | |
| | (4) | | 5 | | | | | | | | | | | | | |
| | (8) | | | | 3 | | | | | 5 | 0.1 | 15 | 5 | | 0.05 | 25 |
| | (9) | | | | | | 3 | | | | | | | | | |

TABLE 1-continued

| Component (mole %) | Polyesterdiol | | | | | | | | | | | | | | |
|---|---|---|---|---|---|---|---|---|---|---|---|---|---|---|---|
| | (1) | (2) | (3) | (4) | (5) | (6) | (7) | (8) | (9) | (10) | (11) | (12) | (13) | (14) | (15) |
| (10) | | | | | 1 | | | | | | | | | | |
| (21) | | | | | | 3 | | | | | | | | | |
| (35) | | | | | | | 5 | | | | | | | | |
| (54) | | | | | | | | | 5 | | | | | | |
| Molecular weight of polyesterdiol ($\times 10^3$) | 2.5 | 2 | 2 | 1.2 | 2.5 | 2 | 2 | 2 | 2 | 3.5 | 2 | 1 | 2 | 2 | 1.8 |

The phosphorus compounds in Table 1 are as follows:
(1) Sodium 2,3-dihydroxypropylphenylphosphinite
(4) 2,3-Dihydroxypropylephenylphosphinite
(8) Sodium 2,3-dihydroxypropylphenylphosphinate
(9) Potassium 2,3-dihydroxypropylphenylphosphinate
(10) Sodium 2,3-dihydroxypropyl-2-sodiumoxyphenylphosphinate
(21) Sodium bis(hydroxypropyl)phosphinite
(35) Sodium bis(hydroxypropyl)phosphinate
(54) Sodium carboxyethylethoxyphosphonate Preparation (1) of polyurethane resin To a reactor equipped with a thermometer, a stirrer and a reflux condenser were added 147 parts of toluene, 147 parts of methyl ethyl ketone, 100 parts of the foregoing polyesterdiol(1), 5 parts of neopentyl glycol and 0.01 part of p-toluenesulfonic acid (antigelling agent). After dissolving the mixture, 21 parts of 4,4'-diphenylmethanediisocyanate and 0.05 part of dibutyltin dilaurate were added, and reaction was carried out at 70° to 80° C. for 10 hours.

The resulting polyurethane resin solution had the following properties: Solid content, 30%; viscosity, 50 poises (25° C.); and molecular weight of polyurethane resin (A), 21,000.

Preparation (2) of polyurethane resin

To a reactor equipped with a thermometer, a stirrer and a reflux condenser were added 169 parts of toluene, 169 parts of methyl ethyl ketone, 50 parts of the above polyesterdiol (1), 50 parts of polybutylene adipate having a molecular weight of 2,000 and 0.01 part of p-toluenesulfonic acid. After dissolving the mixture, 34.5 parts of diphenylmethanediisocyanate and 0.05 part of dibutyltin dilaurate were added, and reaction was carried out at 70° C. for 2 hours. Thereafter, 10 parts of neopentyl glycol was added, and reaction was carried out at 70° to 80° C. for 8 hours.

The resulting polyurethane resin (B) solution had the following properties: Solid content, 30%; viscosity, 22 poises (25° C.); and the molecular weight of the polyurethane resin (B), 28,000.

Polyurethane resins (C) to (N) were obtained from the materials shown in Table 2 in the same manner as in Preparation (1) or (2).

Comparative preparation (1) of polyurethane resin

The polyurethane resin (O) solution was obtained in the same manner as in Preparation (1) of polyurethane resin except that polyesterdiol (13) (molecular weight, 2,000; contains no copolymerized phosphorus compound) was used in place of polyesterdiol (1). The solid content and viscosity of the solution were 30% and 7 poises (25° C.), respectively, and the molecular weight of the polyurethane resin (O) was 25,000.

Polyurethane resins (O) to (U) were obtained from the materials shown in Table 2 in the same manner as in Preparation (1) or (2).

TABLE 2

| Polyurethane resin | | (A) | (B) | (C) | (D) | (E) | (F) | (G) | (H) | (I) | (J) | (K) | (L) | (M) | (N) |
|---|---|---|---|---|---|---|---|---|---|---|---|---|---|---|---|
| Polyesterdiol (part) | | (1) 100 | (1) 50 PBA 50 | (2) 100 | (3) 100 | (4) 100 | (5) 100 | (6) 100 | (7) 100 | (8) 100 | (9) 100 | (10) 100 | (11) 100 | (12) 10 | (12) 50 PCL 50 |
| Polyisocyanate (part) | | MDI 21 | MDI 34.5 | TDI 24 | TDI 21 | IPDI 38.5 | MDI 21.8 | MDI 28 | MDI 26 | MDI 34 | MDI 36 | MDI 25 | MDI 28.5 | MDI 35 | MDI 32 |
| Chain extender (part) | | NPG 5 | NPG 10 | NPG 7 HD 3 | NPG 7 HD 3 | NPG 7 HD 3 | NPG 5 | PG 5 | PG 5 | NPG 10 | NPG 10 | NPG 4 DEG 4 | NPG 4 DEG 4 | NPG 7 | NPG 7 |
| Solution characteristics | Solvent | (X) | (X) | (X) | (X) | (Y) | (X) | (X) | (X) | (X) | (X) | (X) | (X) | (X) | (X) |
| | Solid content (%) | 30 | 30 | 30 | 30 | 30 | 30 | 30 | 30 | 30 | 30 | 30 | 15 | 30 | 30 |
| | Viscosity (poise, 25° C.) | 50 | 22 | 8 | 7 | 24 | 110 | 30 | 12 | 25 | 830 | 8 | 550 | 12 | 8 |
| Resin characteristics | Molecular weight ($\times 10^3$) | 21 | 28 | 15 | 6.5 | 20 | 38 | 24 | 9 | 14 | 47 | 20 | 10 | 8 | 10 |

| | Comparative polyurethane resin | (O) | (P) | (Q) | (R) | (S) | (T) | (U) |
|---|---|---|---|---|---|---|---|---|
| | Polyesterdiol (part) | (13) 100 | (14) 100 | (15) 100 | (9) 100 | (3) 100 | (13) 100 | (13) 100 |
| | Polyisocyanate (part) | MDI 24 | MDI 23.5 | MDI 23 | MDI 36.3 | TDI 20 | MDI 23 | MDI 23 |
| | Chain extender (part) | NPG 5 | NPG 5 | NPG 5 | NPG 10 | NPG 7 HD 3 | NPG Disodium β-glycerophosphoric acid, 1 | NPG Phosphorus compound (1), 1 |
| Solution charac- | Solvent | (X) | (X) | (X) | (X) | (X) | (X) | (X) |
| | Solid content | 30 | 30 | 10 | 30 | 30 | 30 | 30 |

TABLE 2-continued

| teristics | (%) | | | | | | | |
|---|---|---|---|---|---|---|---|---|
| | Viscosity (poise, 25° C.) | 7 | 10 | 2800 | 1800 | 5 | Uniform solution was not obtained because of precipitation of phosphorus compound. | Uniform solution was not obtained because of precipitation of phosphorus compound. |
| Resin charac- teristics | Molecular weight ($\times 10^3$) | 25 | 29 | 7.5 | 52 | 5.8 | — | — |

Symbols and abbreviations in Tables 2-1 and 2-2 mean the followings:
PBA Polybutylene adipate
PCL Polycaprolactone
MDI 4,4'-Diphenylmethanediisocyanate
TDI 2,4-Tolylenediisocyanate
IPDI Isophoronediisocyanate
NPG Neopentyl glycol
HD 1,6-Hexanediol
DEG Diethylene glycol
Solvent (X) Methyl ethyl ketone/toluene 1:1 (by weight) mixture
Solvent (Y) Ethyl acetate

EXAMPLES 1-19, COMPARATIVE EXAMPLES 1-8

A mixture having the composition described below was dispersed for 48 hours by means of a ball mill, and after adding 5 parts of an isocyanate compound (Coronate 2030; produced by Nippon Polyurethane Kogyo Co.) as a curing agent, mixing was carried out for further 1 hour to obtain a magnetic paint. This paint was coated onto polyethylene terephthalate film of 12 μ in thickness so that the thickness after drying was 5 μ, while applying a magnetic field of 2,000 gauss. After allowing to stand at 50° C. for 2 days, the product was slitted in a width of 0.5 inch to obtain a magnetic tape.

| | Parts |
|---|---|
| Polyurethane resin (A) solution (solid content, 30% MEK/toluene 1:1 solution) | 100 |
| Cobalt-containing $\gamma Fe_2O_3$ | 120 |
| Olive oil | 1 |
| Cyclohexanone | 50 |
| Toluene | 100 |
| MEK | 50 |

The magnetic tape obtained was measured for the gloss of magnetic layer, abrasion after 100 runnings and adhesiveness to polyethylene terephthalate film. The result is shown in Table 3-1.

EXAMPLES 2 TO 19 AND COMPARATIVE EXAMPLES 1 to 8

Magnetic tape was produced in the same manner as in Example 1 but using the resins shown in Tables 3-1 to 3-3 in place of the polyurethane resin (A). The result of evaluation of the tape is shown in Tables 3-1 to 3-3.

Hereupon, the weight ratio of binder to magnetic particle is 1:4.

In Tables 3-1 to 3-3, resins added to the polyurethane resin solutions are as follows:
Adipate type polyurethane: Nippollane 2301 (produced by Nippon Polyurethane Co.)
Nitrocellulose: RS ½ (produced by Daiseru Co.)
Vinyl chloride/vinyl acetate resin: VAGH (produced by U.C.C.)

As apparent from Table 3-1 to 3-3, the magnetic recording medium produced with the polyurethane resin which contains copolymerized phosphorus compound in amounts specified by the present invention, is superior in the squareness ratio, gloss of magnetic layer, abrasion after 100 runnings and adhesiveness to PET film.

TABLE 3

| | Binder | Squareness ratio (Br/Bm) | Gloss of magnetic layer (%) | Abrasion after 100 runnings | Adhesive- ness to PET film |
|---|---|---|---|---|---|
| Example | | | | | |
| 1 | Polyurethane resin (A) | 0.85 | 80 | Little | O |
| 2 | Polyurethane resin (A)/adipate type | 0.81 polyure- thane = 1:1 | 72 | Little | O |
| 3 | Polyurethane resin (B) | 0.84 | 78 | Little | O |
| 4 | Polyurethane resin (C) | 0.75 | 55 | Slightly remarkable | O |
| 5 | Polyurethane resin (D) | 0.86 | 85 | Little | O |
| 6 | Polyurethane resin (E) | 0.84 | 81 | Little | O |
| 7 | Polyurethane resin (F) | 0.86 | 86 | Little | O |
| 8 | Polyurethane resin (F)/adipate type polyurethane = 1:1 | 0.82 | 76 | Little | O |
| 9 | Polyurethane resin (G) | 0.84 | 79 | Little | O-Δ |
| 10 | Polyurethane resin (H) | 0.85 | 83 | Slightly remarkable | Δ |
| 11 | Polyurethane resin (I) | 0.79 | 78 | Slightly remarkbale | Δ |
| 12 | Polyurethane resin (J) | 0.84 | 80 | Remarkable | Δ |
| 13 | Polyurethane resin (J)/nitro- cellulose = 1:1 | 0.80 | 80 | Slightly remarkable | Δ |
| 14 | Polyurethane resin (J)/vinyl chloride-vinyl acetate resin = | 0.78 | 80 | Slightly remarkable | Δ |

TABLE 3-continued

| | Binder | Squareness ratio (Br/Bm) | Gloss of magnetic layer (%) | Abrasion after 100 runnings | Adhesiveness to PET film |
|---|---|---|---|---|---|
| 15 | Polyurethane resin (K) 1:1 | 0.75 | 70 | Slightly remarkable | O |
| 16 | Polyurethane resin (L) | 0.83 | 80 | Little | O |
| 17 | Polyurethane resin (M) | 0.86 | 87 | very little | O |
| 18 | Polyurethane resin (M)/adipate type polyurethane = 1:1 | 0.79 | 77 | very little | O |
| 19 | Polyurethane resin (N) | 0.85 | 84 | very little | O |
| Comparative example | | | | | |
| 1 | Polyurethane resin (O) | 0.55 | 3 | Very remarkable | Δ |
| 2 | Polyurethane resin (O)/adipate type polyurethane = 1:1 | 0.52 | 3 | Very remarkable | X |
| 3 | Polyurethane resin (P) | 0.68 | 10 | Remarkable | O |
| 4 | Polyurethane resin (P)/adipate type polyurethane = 1:1 | 0.60 | 5 | Very remarkable | X |
| 5 | Polyurethane resin (Q) | 0.79 | 77 | Slightly remarkable | X |
| 6 | Polyurethane resin (Q)/adipate type polyurethane = 1:1 | 0.72 | 55 | Remarkable | X |
| 7 | Polyurethane resin (R) | 0.72 | 52 | Slightly remarkable | Δ |
| 8 | Polyurethane resin (S) | 0.78 | 78 | Very remarkable | Δ |

Preparation (2) of polyesterdiol

To an autoclave equipped with a thermometer and a stirrer were added 466 parts of dimethyl terephthalate, 194 parts of dimethyl isophthalate, 409 parts of ethylene glycol, 458 parts of neopentyl glycol and 0.68 part of tetrabutoxy titanate, and the temperature of the mixture was kept at 150° to 230° C. for 120 minutes to carry out ester interchange. Thereafter, 219 parts of adipic acid and 36 parts of the above phosphorus compound (6) were added, and reaction was carried out at 220° to 230° C. for further 1 hour. Thereafter, the reaction system was heated to 250° C. in 30 minutes, the pressure of the system was then gradually released to 10 mmHg in 45 minutes, and reaction was continued for further 60 minutes under this condition. The resulting polyesterdiol (16) had a molecular weight of 2,000 and a phosphorus content of 3,100 ppm. The polyesterdiols (17) to (25) obtained by the same method as above are shown in Table 4.

The components of the polyesterdiols were analyzed by NMR. The polyesterdiols (23) and (25) in Table 4 showed no rise in viscosity during polymerization. In the case of the polyesterdiol (24), the sodium salt of the phosphorus compound agglomerated into granules to completely separate from the resin.

TABLE 4

| Component (mole %) | | (16) | (17) | (18) | (19) | (20) | (21) | (22) | (23) | (24) | (25) |
|---|---|---|---|---|---|---|---|---|---|---|---|
| Acid component | Terephthalic acid | 48 | 35 | 35 | 35 | 35 | 50 | 50 | 50 | 50 | 50 |
| | Isophthalic acid | 20 | 32 | 32 | 32 | 35 | 50 | 10 | 47 | 47 | 47 |
| | Adipic acid | 30 | 30 | 30 | 30 | 30 | — | — | — | — | — |
| Glycol component | Ethylene glycol | 52 | 53 | 53 | 60 | 52 | 54 | 53 | 60 | 60 | 60 |
| | Neopentyl glycol | 48 | 47 | 47 | 40 | 48 | 46 | 47 | 40 | 40 | 40 |
| Phosphorus component | Phosphorus compound (6) | 2 | — | — | — | — | — | — | — | — | — |
| | Phosphorus compound (25) | — | 3 | — | — | — | — | — | — | — | — |
| | Phosphorus compound (12) | — | — | 3 | — | 3 | — | — | — | — | — |
| | Phosphorus compound (44) | — | — | — | 3 | — | — | 40 | — | — | — |
| | Amylphosphinic acid mono-amyl monosodium salt | — | — | — | — | — | — | — | 3* | — | — |
| | Benzenephosphonic acid monomethyl sodium salt | — | — | — | — | — | — | — | — | 3* | — |
| | Dimethylphosphoric acid monosodium salt | — | — | — | — | — | — | — | — | — | 3* |
| Physical property | Molecular weight | 2000 | 5000 | 3500 | 2100 | 3500 | 5000 | 3500 | No polymerization occurred. | Phosphorus compound was separated. | No polymerization occurred. |
| | Phosphorus content (ppm) | 3100 | 3900 | 4300 | 3500 | 3400 | 0 | 90000 | — | — | — |
| | Acid value (KOH mg/g) | 1.0 | 0.9 | 2.3 | 1.3 | 34 | 2.1 | 0.8 | — | — | — |

*Mole % based on the total acid components fed.

Preparation (1) of polyurethane-acrylate resin

To a reactor equipped with a thermometer, a stirrer and a reflux condenser were added 72 parts of toluene, 72 parts of methyl ethyl ketone and 100 parts of polyesterdiol (16), and after dissolving the mixture, 10.8 parts of 2,4-tolylenediisocyanate and 0.05 part of dibutyltin dilaurate were added. After carrying out reaction at 70° to 80° C. for 3 hours, 33 parts of pentaerythritol triacrylate was added, and reaction was carried out at 70° to 80°

C. for 10 hours to obtain a polyurethane-acrylate resin solution having a solid content of 50 wt. %. The solvent was evaporated from the reaction solution. The polyurethane-acrylate resin (A) had a molecular weight of 2,700 and a phosphorus content of 2,900 ppm. Polyurethane-acrylate resins (B), (C), (D), (E) and (F) produced by the same method as above are shown in Table 5.

Preparation (2) of polyurethane-acrylate resin

To a reactor equipped with a thermometer, a stirrer and a reflux condenser were added 65 parts of toluene, 65 parts of methyl ethyl ketone and 100 parts of polyesterdiol (18). After dissolving the mixture, 17.1 parts of diphenylmethanediisocyanate and 0.05 part of dibutyltin dilaurate were added, and reaction was carried out at 70° to 80° C. for 3 hours. After cooling to 60° C., 10 parts of pentaerythritol triacrylate was added, the system was heated to 70° to 80° C., and reaction was carried out for 2 hours at the same temperature. Thereafter, 4 parts of neopentyl glycol was added, and reaction was carried out at 70° to 80° C. for 6 hours to obtain a polyurethaneacrylate resin solution having a solid content of 50 wt. %. The solvent was evaporated from the reaction solution to obtain a polyurethane-acrylate resin (G) having a molecular weight of 12,000 and a phosphorus content of 3,100 ppm. Polyurethane-acrylate resins (H) and (I) obtained by the same method are shown in Table 5.

heated to 70° to 80° C., and reaction was carried out at the same temperature for 6 hours to obtain an epoxy-acrylate resin solution having a solid content of 47.4 wt. %. The solvent was evaporated from the reaction solution to obtain an epoxy-acrylate resin (A) having a molecular weight of 2,100 and a phosphorus content of 3,650 ppm.

Preparation of acrylate compound

To a reactor equipped with a thermometer, a stirrer and a reflux condenser were added 100 parts of the phosphorus compound (13), 100 parts of methacrylic acid and 0.02 part of phenothiazine, and the mixture was heated to 90° C. Reaction was then carried out at the same temperature for 4 hours while distilling water and excess methacrylic acid out of the system, to obtain a viscous acrylate compound (A). This acrylate compound (A) had a molecular weight of 665 and a phosphorus content of 45,000 ppm.

EXAMPLES 20 TO 29 AND COMPARATIVE EXAMPLES 9 AND 10

|  | Part |
|---|---|
| Magnetic powder (cobalt-containing γ-Fe$_2$O$_3$) | 60 |
| Polyurethane-acrylate resin (A) solution (solid content, 50%; solvent, methyl ethyl ketone/toluene 1:1 mixture) | 30 |
| Methyl ethyl ketone | 25 |
| Toluene | 25 |
| Methyl isobutyl ketone | 25 |

TABLE 5

| Component (part) | | Polyurethane-acrylate resin | | | | | | | | |
|---|---|---|---|---|---|---|---|---|---|---|
|  |  | (A) | (B) | (C) | (D) | (E) | (F) | (G) | (H) | (I) |
| Polyesterdiol | (16) | 100 | — | — | — | — | — | — | — | — |
|  | (17) | — | 100 | — | — | — | — | — | — | — |
|  | (18) | — | — | 100 | — | — | — | 100 | — | — |
|  | (19) | — | — | — | 100 | — | — | — | 100 | 100 |
|  | (21) | — | — | — | — | 100 | — | — | — | — |
|  | (22) | — | — | — | — | — | 100 | — | — | — |
|  | Nippollane 4070 | — | — | — | — | — | — | — | — | 100 |
| Diisocyanate | 2,4-Tolylene-diisocyanate | 10.8 | 7 | 10 | 19 | 8.0 | 10 | — | — | — |
|  | Diphenylmethane-diisocyanate | — | — | — | — | — | — | 17.1 | 27.4 | 48.8 |
| Terminal-modifier | Pentaerythritol triacrylate | 33 | 10 | 20 | 20 | 10 | 20 | 10 | 20 | 20 |
| Chain extender | Neopentyl glycol | — | — | — | — | — | — | 4 | 8.7 | 30 |
| Physical property | Molecular weight | 2700 | 5800 | 4200 | 2900 | 6000 | 4000 | 12000 | 8000 | 14000 |
|  | Phosphorus content (ppm) | 2900 | 3300 | 3300 | 2500 | 0 | 43000 | 3100 | 2300 | 1750 |

Preparation of polyester-acrylate resin

To a reactor equipped with a thermometer, a stirrer and a reflux condenser were added 55 parts of toluene, 55 parts of methyl ethyl ketone and 100 parts of polyesterdiol (20), and after dissolving the mixture, 10 parts of glycidyl methacrylate and 0.05 part of tetraethylamine chloride were added. Reaction was then carried out at 70° to 80° C. for 6 hours to obtain a polyester-acrylate resin solution having a solid content of 50 wt. %. The resulting polyester-acrylate resin (A) had a molecular weight of 3,800 and a phosphorus content of 2,600 ppm.

Preparation of epoxy-acrylate resin

To a reactor equipped with a thermometer, a stirrer and a reflux condenser were added 130 parts of methyl ethyl ketone, 100 parts of an epoxy resin (Epikote 1001, produced by Shell Petrochemical Co.), 0.5 part of the phosphorus compound (12) and 16.9 parts of methacrylic acid, and after dissolving the mixture, 0.1 part of triphenylphosphine was added. The mixture was then A mixture of the above composition was mixed for 24 hours by means of a ball mill to obtain a magnetic coating material. This coating material was coated onto a polyethylene terephthalate film of 25 μ in thickness so that the film thickness after drying was 6 μm. Thereafter, the coating film obtained was subjected to orientation treatment for 0.05 second in its lengthwise direction by applying direct current magnetic field of 2,500 gauss, and after hot-air dried at 100° C. for 1 minute, further subjected to calendering and 5-Mrad radiation treatment. The resulting tape had a Br/Bm ratio (squareness ratio) of 0.89. Thereafter, a commercial cellophane adhesive tape was closely adhered to the surface of this magnetic coating film and then peeled off, but adhesion between the magnetic coating film and the polyester film was good, there being no peeling from each other.

Using the solution of each of the polurethane-acrylate resin, polyester-acrylate resin, epoxy-acrylate resin and acrylate compound shown in Table 5 in a methyl ethyl ketone/toluene 1:1 (by weight) mixture, a magnetizable layer was formed on polyethylene terephthalate film in the same manner as above, and the physical properties of the layer were measured. The result is shown in Table 6.

TABLE 6

|  |  | Example | | | | | | | | | | Comparative example | |
|---|---|---|---|---|---|---|---|---|---|---|---|---|---|
|  |  | 20 | 21 | 22 | 23 | 24 | 25 | 26 | 27 | 28 | 29 | 9 | 10 |
| Binder | Other radiation-curable resin |  |  |  |  |  |  |  | *1 | *2 | *3 |  |  |
|  | Polyurethane-acrylate resin | (A) | (B) | (C) | (D) | (G) | (H) | (I) |  |  |  | (E) | (F) |
| Physical property | Br/Bm | 0.87 | 0.87 | 0.88 | 0.87 | 0.87 | 0.87 | 0.87 | 0.87 | 0.87 | 0.87 | 0.75 | 0.87 |
|  | Adhesiveness | O | O | O | O | O | O | O | O | Δ | O | O | X |
|  | Smoothness* | Good | Good | Good | Good | Good | Good | Good | Good | Good | Good | Bad | Good |
|  | Solvent resistance (number of rubs)** | >20 | >20 | >20 | >20 | >20 | >20 | >20 | >20 | >20 | >20 | >20 | >20 |

Preparation (3) of polyesterdiol

To an autoclave equipped with a thermometer and a stirrer were added 485 parts of dimethyl terephthalate, 485 parts of dimethyl isophthalate, 409 parts of ethylene glycol, 458 parts of neopentyl glycol and 0.68 part of tetrabutoxy titanate, and the temperature of the mixture was kept at 150° to 230° C. for 120 minutes to carry out ester interchange. Thereafter, 23.6 parts of the above phosphorus compound (46) was added, and reaction was carried out at 220° to 230° C. for further 1 hour. Thereafter, the reaction system was heated to 250° C. in 30 minutes, the pressure of the system was then gradually released to 10 mmHg in 45 minutes, and reaction was continued for further 60 minutes under this condition. The resulting polyesterdiol (26) had a molecular weight of 20,000 and a phosphorus content of 3,300 ppm. The polyesterdiols (27) to (29) obtained by the same method as above are shown in Table 7. The composition of the polyesterdiols was analyzed by NMR.

TABLE 7

| Component (mole %) | | Polyesterdiol | | | |
|---|---|---|---|---|---|
|  |  | (26) | (27) | (28) | (29) |
| Acid component | Terephthalic acid | 50 | 35 | 50 | 50 |
|  | Isophthalic acid | 50 | 35 | 50 | 50 |
|  | Adipic acid | — | 30 | — | — |
| Gylcol component | Ethylene gylcol | 50 | 50 | 54 | 30 |
|  | Neopentyl gylcol | 48 | 47 | 46 | 30 |
| Phosphorus component | Phosphorus compound (46) | 2 | — | — | 40 |
|  | Phosphorus compound (49) | — | 3 | — | — |
|  | Benzenephosphonic acid monomethyl sodium salt | — | — | — | — |

TABLE 7-continued

| Component (mole %) | | Polyesterdiol | | | |
|---|---|---|---|---|---|
|  |  | (26) | (27) | (28) | (29) |
|  | Dimethylphosphoric acid monosodium salt | — | — | — | — |
| Physical property | Molecular weight | 2000 | 2500 | 5000 | 3500 |
|  | Phosporus content (ppm) | 3300 | 3900 | 0 | 90000 |
|  | Acid value (KOH mg/g) | 2.0 | 1.2 | 1.0 | 2.3 |

Preparation (3) of polyurethane resin

To a reactor equipped with a thermometer, a stirrer and a reflux condenser were added 147 parts of toluene, 147 parts of methyl ethyl ketone, 100 parts of the foregoing polyesterdiol (26), 5 parts of neopentyl glycol and 0.01 part of p-toluenesulfonic acid (antigelling agent). After dissolving the mixture, 21 parts of 4,4'-diphenylmethanediisocyanate and 0.05 part of dibutyltin dilaurate were added, and reaction was carried out at 70° to 80° C. for 10 hours.

The resulting polyurethane resin solution had the following properties: Solid content, 30%; viscosity, 50 poises (25° C.); and molecular weight of polyurethane resin (V), 21,000. The polyurethane resin (W) obtained by the same method as above is shown in Table 8.

Preparation (3) of polyurethane-acrylate resin

To a reactor equipped with a thermometer, a stirrer and a reflux condenser were added 72 parts of toluene, 72 parts of methyl ethyl ketone and 100 parts of polyesterdiol (26), and after dissolving the mixture, 10.8 parts of 2,4-tolylenediisocyanate and 0.05 part of dibutyltin dilaurate were added. After carrying out reaction at 70° to 80° C. for 3 hours, 33 parts of pentaerythritol triacrylate was added, and reaction was carried out at 70° to 80° C. for 10 hours to obtain a polyurethane-acrylate resin solution having a solid content of 50 wt. %. The solvent was evaporated from the reaction solution. The polyurethane-acrylate resin (J) had a molecular weight of 2,700 and a phosphorus content of 2,300 ppm. Polyurethane-acrylate resins (K), (L) and (M) produced by the same method as above are shown in Table 8.

TABLE 8

| Component (part) | | Polyurethane resin | | Polyurethane-acrylate resin | | | |
|---|---|---|---|---|---|---|---|
|  |  | (V) | (W) | (J) | (K) | (L) | (M) |
| Polyesterdiol | (26) | 100 | — | 100 | — | — | — |
|  | (27) | — | 100 | — | 100 | — | — |
|  | (28) | — | — | — | — | 100 | — |
|  | (29) | — | — | — | — | — | 100 |
| Diisocyanate | 2.4-Tolylene-diisocyanate | — | — | 10.8 | — | 4.3 | 6.2 |

TABLE 8-continued

| Component (part) | | Polyurethane resin | | Polyurethane-acrylate resin | | | |
|---|---|---|---|---|---|---|---|
| | | (V) | (W) | (J) | (K) | (L) | (M) |
| Terminal-modifier | Diphenylmethane-diisocyanate | 21 | 20 | — | 26 | — | — |
| | Pentaerthritol triacrylate | — | — | 33 | 15 | 15 | 15 |
| Chain extender | Neopentyl glycol | 5 | 3 | — | 2 | — | — |
| Physical property | Molcular weight | 21000 | 25000 | 2700 | 8000 | 5000 | 4050 |
| | Phosphorus content (ppm) | 2600 | 3150 | 2300 | 2760 | 0 | 75000 |

EXAMPLES 30 AND 31

A mixture having the composition described below was dispersed for 48 hours by means of a ball mill, and after adding 5 parts of an isocyanate compound (Coronate 2030; produced by Nippon Polyurethane Kogyo Co.) as a curing agent, mixing was carried out for further 1 hour to obtain a magnetic paint. This paint was coated onto polyethylene terephthalate film of 12 μ in thickness so that the thickness after drying was 5 μ, while applying a magnetic field of 2,000 gauss. After allowing to stand to 50° C. for 2 days, the product was slitted in a width of 0.05 inch to obtain a magnetic tape.

| | Parts |
|---|---|
| Polyurethane resin (V) or (W) solution (solid content, 30%; MEK/toluene 1:1 solution) | 100 |
| Cobalt-containing γ-Fe₂O₃ | 120 |
| Olive oil | 1 |
| Cyclohexanone | 50 |
| Toluene | 100 |
| MEK | 50 |

EXAMPLES 32 AND 33 AND COMPARATIVE EXAMPLES 11 AND 12

| | Parts |
|---|---|
| Magnetic powder (cobalt-containing γ-Fe₂O₃) | 60 |
| Polyurethane-acrylate resin (J) solution (solid content, 50%; solvent, methyl ethyl ketone/toluene 1:1 mixture) | 30 |
| Methyl ethyl ketone | 25 |
| Toluene | 25 |
| Methyl isobutyl ketone | 25 |

A mixture of the above composition was mixed for 24 hours by means of a ball mill to obtain a magnetic coating material. This coating material was coated onto a polyethylene terephthalate film of 25 μ in thickness so that the film thickness after drying was 6 μm. Thereafter, the coating film obtained was subjected to orientation treatment for 0.05 second in its lengthwise direction by applying direct current magnetic field of 2,500 gauss, and after hot-air dried at 100° C. for 1 minute, further subjected to calendering and 5-Mrad radiation treatment.

Using the solution of each of the polyurethane-acrylate resins (K), (L) and (M) shown in Table 8 in a methyl ethyl ketone/toluene 1:1 (by weight) mixture, a magnetizable layer was formed on polyethylene terephthalate film by the same method as above, and the physical properties of the layer were measured. The result is shown in Table 9.

TABLE 9

| | | Example | | | | Comparative example | |
|---|---|---|---|---|---|---|---|
| | | 30 | 31 | 32 | 33 | 11 | 12 |
| Binder | Polyurethane resin | (V) | (W) | | | | |
| | Polyurethane acrylate resin | | | (J) | (K) | (L) | (M) |
| Physical property | Squareness ratio (Br/Bm) | 0.87 | 0.87 | 0.88 | 0.87 | 0.75 | 0.75 |
| | Adhesiveness | O | O | O | O | O | X |
| | Smoothness | Good | Good | Good | Good | Bad | Good |
| | Solvent resistance (number of rubs) | >20 | >20 | >20 | >20 | >20 | >20 |

What we claim is:

1. A magnetic recording medium prepared by applying onto a non-magnetic support a magnetic coating material containing fine ferromagnetic particles dispersed in a binder and curing said magnetic coating material, characterized in that said binder comprises a thermoplastic resin selected from polyester resins and polyurethane resins or a radiation-curable resin selected from polyester acrylate resins and polyurethane acrylate resins wherein there is chemically bonded as a co-monomer in the polymer chain of the resin, at least one phosphorus compound represented by the following formulas:

(I)

(II)

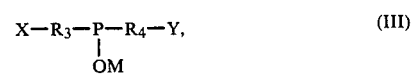

(III)

-continued

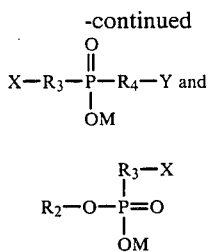

$$X-R_3-\overset{\overset{O}{\|}}{\underset{\underset{OM}{|}}{P}}-R_4-Y \quad \text{and} \tag{IV}$$

$$R_2-O-\overset{\overset{R_3-X}{|}}{\underset{\underset{OM}{|}}{P}}=O \tag{V}$$

wherein each of X and Y is an ester-forming functional group, $R_1$ is a trivalent hydrocarbon group having 3-10 carbon atoms, $R_2$ is a member selected from the class consisting of alkyl groups having 1-12 carbon atoms, cycloalkyl groups, aryl groups, alkoxy groups having 1-12 carbon atoms, cycloalkoxy groups and aryloxy groups wherein the aryl group may be substituted with a halogen atom, a hydroxyl group, a group of the formula —OM′, wherein M′ represents an alkali metal, or an amino group, each of $R_3$ and $R_4$ is a member selected from the class consisting of alkylene groups having 1-12 carbon atoms, cycloalkylene groups, arylene groups and groups of the formula —$CH_2$-$(OR_5)m$ wherein $R_5$ is a group selected from the class consisting of alkylene groups having 1-12 carbon atoms, cycloalkylene groups and arylene groups, and m is any number from 1 to 4, and M represents an alkali metal, hydrogen atom, an alkyl group having 1-4 carbon atoms or an amino group, the content of the phosphorus compound in the resin being 100 ppm to 20,000 ppm calculated as phosphorus atoms.

2. A magnetic recording medium according to claim 1 wherein the thermoplastic resin is a polyurethane resin which has a molecular weight of 6,000-50,000 and is produced by reacting (A) a polyesterdiol of a molecular weight of 500-5,000, (B) a chain extender having a molecular weight less than 500 and (C) a polyisocyanate, at least a part of said polyesterdiol (A) being prepared by the use of the phosphorus compound as a comonomer in an amount of 0.1-20 mole % based on the whole dicarboxylic acid or whole glycol component.

3. A method of producing a magnetic recording medium which comprises coating a non-magnetic support with a magnetic coating material wherein fine ferromagnetic particles are dispersed in the binder defined in claim 1 and curing agent, and then curing the coated material.

4. A magnetic recording medium according to claim 1 wherein the phosphorous compound is a compound of the formula (I).

5. A magnetic recording medium according to claim 1 wherein the phosphorous compound is a compound of the formula (II).

6. A magnetic recording medium according to claim 1 wherein the phosphorous compound is a compound of the formula (III).

7. A magnetic recording medium according to claim 1 wherein the phosphorous compound is a compound of the formula (IV).

8. A magnetic recording medium according to claim 1 wherein the phosphorous compound is a compound of the formula (V).

* * * * *